United States Patent [19]

Sessler

[11] 4,195,537
[45] Apr. 1, 1980

[54] AUTOMATIC TRANSMISSION

[76] Inventor: John A. Sessler, 1600 W. Townline Rd., Rte. #2, Milton, Wis. 53563

[21] Appl. No.: 815,654

[22] Filed: Jul. 14, 1977

Related U.S. Application Data

[63] Continuation of Ser. No. 686,915, May 17, 1976, Pat. No. 4,049,103, which is a continuation-in-part of Ser. No. 511,443, Oct. 2, 1974, abandoned.

[51] Int. Cl.² .......................... F16H 3/44; F16H 57/10
[52] U.S. Cl. .................................. 74/781 R; 74/752 D
[58] Field of Search ................ 74/781 R, 784, 752 D; 192/41 R, 107 T, 105 BA, 105 CD, 105 CE, 103 B, 107 M, 45.1

[56] References Cited

U.S. PATENT DOCUMENTS

| | | | |
|---|---|---|---|
| 2,459,829 | 1/1949 | Maxwell | 74/752 D |
| 2,947,399 | 8/1960 | Moore et al. | 192/105 BA |
| 3,024,886 | 3/1962 | Peras | 192/105 CE |
| 3,115,792 | 12/1963 | Grattan | 192/105 CD |
| 3,283,867 | 11/1966 | Rice | 192/105 CD |
| 3,501,980 | 3/1970 | Arick | 74/781 R |
| 4,049,103 | 9/1977 | Sessler | 192/105 BA X |

Primary Examiner—Benjamin Wyche

[57] ABSTRACT

An automatic transmission for utilization with a dry clutch apparatus which may be electrically shifted to transmit torque from an engine to a vehicle's wheels. As a motor's speed picks up, the clutch apparatus drum drives the automatic transmission. Under runaway conditions, the clutch drum is rotated by the load acting through the transmission. The load is capable of driving the drum even faster than the motor rotates the shoes at which time slippage occurs and the motor is relieved. Through such a feature, the transmission may be shifted up or down at any speed.

11 Claims, 5 Drawing Figures

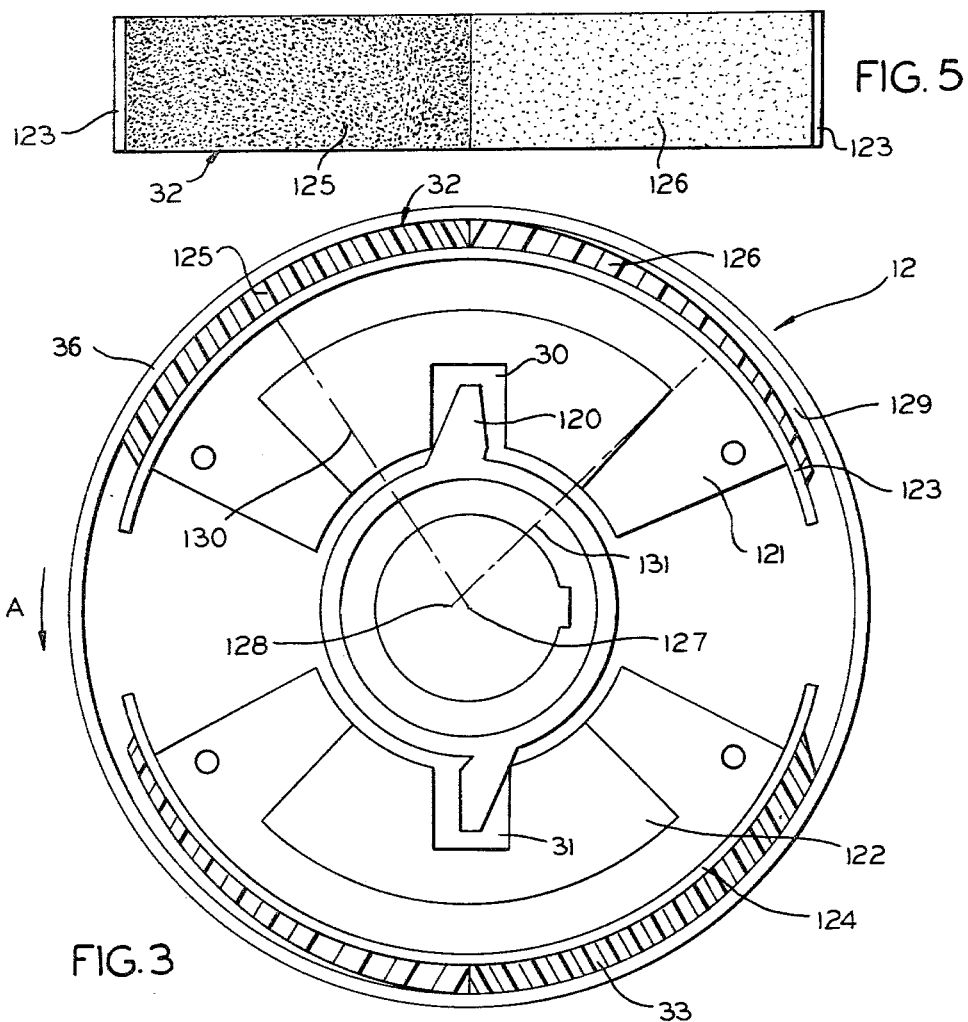
FIG. 5
FIG. 3
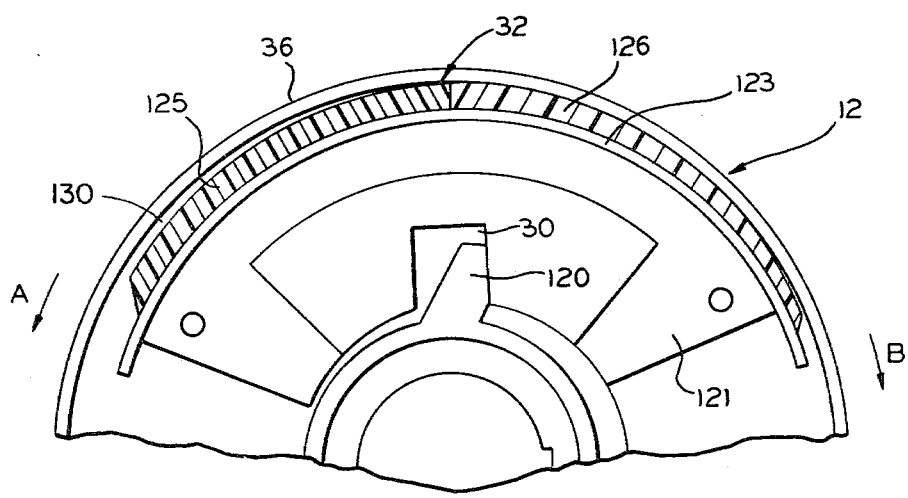
FIG. 4

AUTOMATIC TRANSMISSION

This is a continuation application of my co-pending application, Ser. No. 686,915, filed May 17, 1976, now U.S. Pat. No. 4,049,103, which in turn was a continuation-in-part application of Ser. No. 511,443 filed Oct. 2, 1974, now abandoned.

The present invention relates to automatic transmissions and more particularly to transmissions which cannot be over-run and which do not have wet clutches.

Automatic transmissions usually include a fluid coupling which protects them from sudden and unacceptable torques. However, these fluid couplings tend to be wasteful and inefficient. If a dry, direct contact is used, the efficiency increases, but the clutch does not protect the system, including its motor, against sudden loading or against over-run. The problem is especially severe when the transmission is shifted from a high speed range to a low speed range.

Accordingly, an object of the invention is to provide an automatic transmission with a dry clutch which may be shifted up or down at almost any speed.

Here an object is to protect the transmission from sudden application of loads and to relieve the transmission and its driving motor from overload conditions.

Another object is to provide electrically shifted automatic transmissions.

In keeping with an aspect of the invention, these and other objects are accomplished by a clutch comprising a pair of spring loaded shoes and a drum, somewhat like brake shoes and a drum. As the motor speed picks up, the shoes are flung outwardly under centrifugal force. When the speed is great enough the shoes grip the drum and turn it. The rotational forces transmitted from the motor through the drum drives the automatic transmission. Under runaway conditions, the drum is rotated by the load, perhaps even faster than the motor rotates the shoes. Then, a slippage occurs, and the motor is relieved. The same results are obtained when the transmission is shifted to low under high speed conditions.

The clutch comprises one or more clutch shoes, each having two or more lining surface regions of different shoe material. For example, one side of the shoe has a lining fabricated of a material with a substantial high coefficient of friction and the other side of the individual shoe has a lining with substantially low relative coefficient of friction. A driving notch in the shoe web has substantially parallel sides within which a driving tooth from the driver is housed. The shoe itself has a smaller radius of curvature than the inside periphery of the drum. Thus, only a portion of the shoe will be in contact with the drum when the shoe is flung outwardly under centrifugal force.

In the present invention it is thus possible to differentiate between lining portions in contact with the drum in a first instance, when the shoes drive the drum, and a second instance, when the drum is being driven faster than the driver, such as in a runaway or down-shifting situation.

The drive tooth and notch configuration serves to act upon the lever-like shoe to place the higher coefficient of friction lining portion in contact with the drum when the drum is being driven by the driver. Alternatively, it changes the position of the lever-like shoe and positions the lower coefficient of friction portion of the lining against the drum when the drum rotates faster than the driver. In this situation, the drum and driver tend to slip relative to one another.

The nature of a preferred embodiment of the invention is shown in the attached drawing, wherein:

FIG. 3 is a front elevational cross-sectional view of the two-way clutch construction, particularly showing operation as the shoes drive the drum;

FIG. 4 is a partial view in front elevational cross-section of the same clutch construction of FIG. 3, wherein the shoes of the clutch are being overrun by the drum with resulting slippage therebetween; and FIG. 5 is a top view of the double-lined clutch shoe of the present invention.

Figure 1:
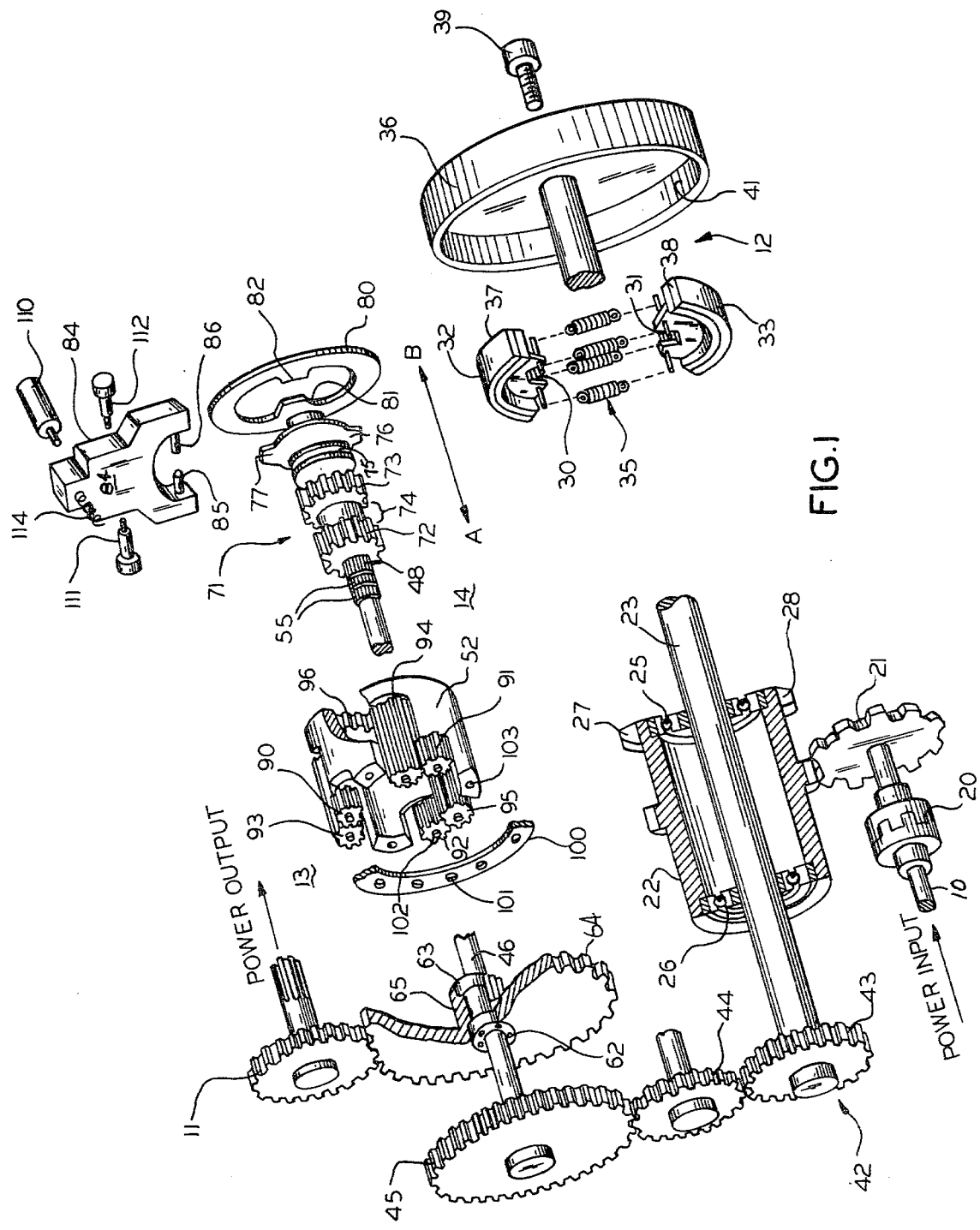
FIG. 1 is an exploded view of the automatic transmission, including a planetary gear and a clutch.

An electrically operated power train is shown in FIG. 1, as being driven from a motor (not shown) connected to a shaft 10 and as driving an output gear 11, which may be coupled to almost anything, such as a snowmobile, for example. Between this input 10 and output 11 are a clutch assembly 12, a planetary gear assembly 13, and a gear rate selector 14.

In greater detail, the drive shaft is coupled at 20 to an input pinion 21, meshingly engaging gear teeth on the outside one of a co-axial pair of drive shafts 22,23. The clutch shoes 32,33 are held together by springs 35, in a compact position which fits freely inside of clutch drum 36.

When the outside co-axial shaft 22 rotates, teeth 27,28 move in the receiving members 30,31 and centrifugal force separates the clutch shoes 32,33, thereby overcoming the springs 35. This clutch arrangement allows the motor to get up to speed before the load is placed on it. The linings 37,38 engage the inside perimeter 41 of the clutch drum 36, thereby frictionally gripping it. The clutch 12 is now engaged.

The inside co-axial shaft 23 is integrally attached to and turns with the drum 36 by any suitable means, such as bolt 39. Therefore, whenever a motor turns shaft 10, the clutch engages and power is transmitted through the inside co-axial shaft 23 to a gear train 42. This gear train comprises a clutch output gear 43, an idler 44, and a planetary drive gear 45.

Figure 2:
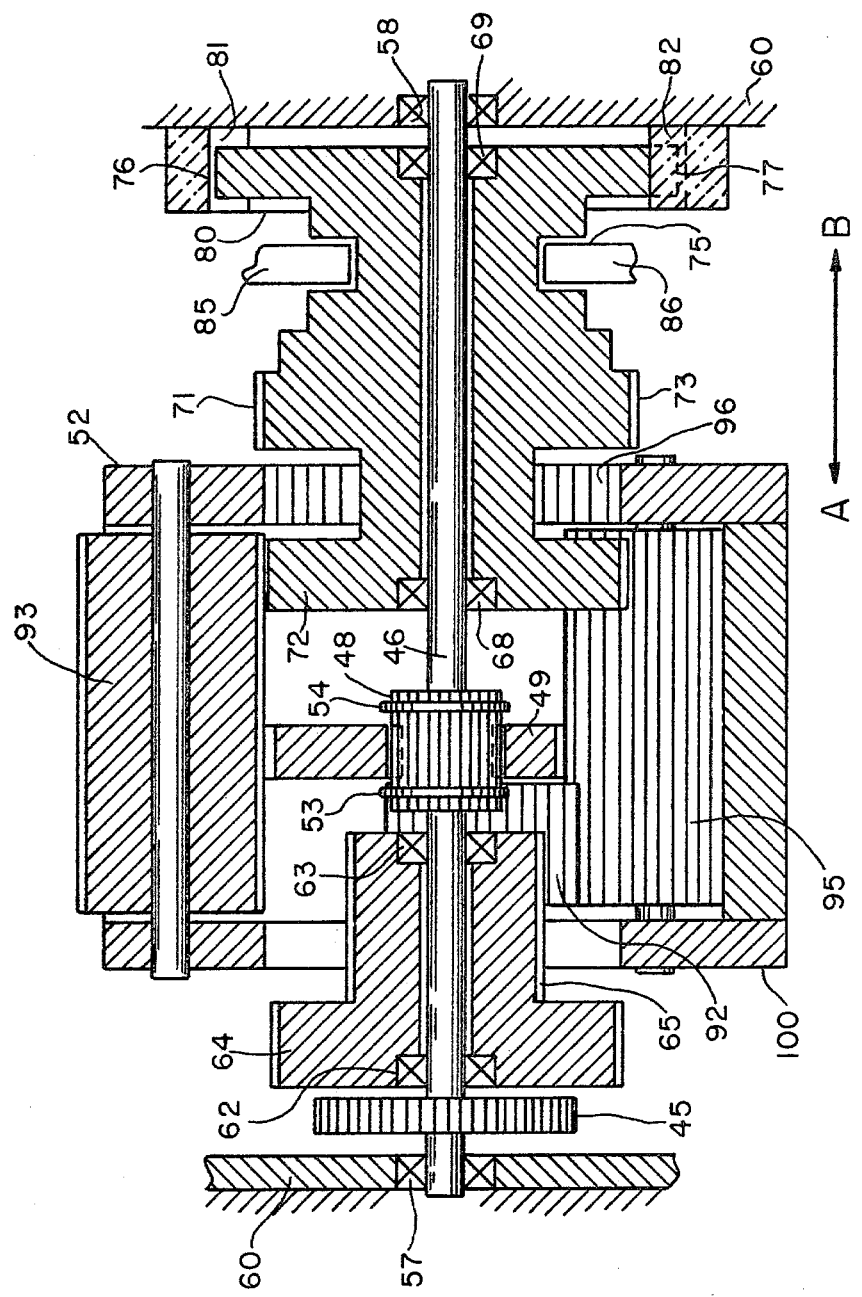
FIG. 2 is a schematic view of the drive shaft of the planetary gear transmission.

The planetary drive shaft and gear are shown schematically in FIG. 2 and pictorially in FIG. 1. In greater detail, drive shaft 46 is integrally formed with the planetary drive shaft gear 45 and splines 48. These splines fit into mating splines in a central partition 49 in a planetary gear carrier 52. Thus, as the gear train 42 drives gear 45, shaft 46 rotates to turn its integral splines 48 and therefore planetary gear carrier 52. The central partition 49 is held in place on the shaft 46 by means of snap rings 53,54 which fit into grooves 55 on the splines 48.

Drive shaft 46 is mounted at either end on bearings 57,58 fitted into the ends of a transmission housing 60. Mounted on shaft 46, at bearings 62,63 is a unitary gear comprising a planetary output gear 64 and its integral pinion 65.

Also mounted on shaft 46 by means of bearings 68,69 is a single and integral part 71 which comprises two sun gears 72,73 separated by a distance 74, a shifting fork ring 84 and a pair of teeth 76,77. These teeth 76,77 may slide into or out of a ring 80 having a pair of inwardly directed lugs 81,82 which may be part of transmission housing 60.

The part 71 may be shifted back and forth in directions A and B on the shaft 46, by means of shifting fork 84 having pins 85,86. When shifted in direction B so that teeth 76,77 engage lugs 81,82, the sun gear 71 is immobilized. When shifted in direction A so that teeth 76,77 do not engage lugs 81,82, the sun gear 71 is free to rotate on shaft 46.

Integrally co-axial with the planetary power output gear 64 is the pinion gear 65 which meshes with a planetary cluster of relatively short gears 90-92 that are mounted a little closer to the center of the assembly than other relatively long planetary gears 93-95, which they drive.

The sun gear 72 meshes with the long gears regardless of whether unit 71 is slid left or right, in directions A, B. The carrier 52 terminates in a ring gear 96 having internal teeth that mesh with sun gear 73 when the unit 71 is slid to the left, in direction A. The space 74 is opposite the ring gear teeth 96 when the unit 71 is slid to the right, in direction B. The planetary carrier 52 is terminated by an annular retainer plate 100 having a number of bearing points (such as 101) for receiving the end axles (such as 102) of the planetary gears. Any suitable bearing may be used at 101,102. The retainer ring 100 is bolted in place by bolts (not shown) passing into holes (such as 103) on the planetary gear carrier 52.

When the sun gear assembly 71 is moved on drive shaft 46 to the right (Direction B, as viewed in the figure), the sun gear 72 drivingly engages the planetary gears 93-95, which drive the gears 90-92 and in turn the gears 65, 64, 11. The righthand end of the sun gear unit 71 includes two teeth 76,77 which engage two immobile lugs 81,82 in anchor ring 80 to hold the sun gear immobile. At this time the internal carrier teeth 96 are opposite the space 74, between the sun gears 72,73. The transmission is now operating in high speed. When the sun gear unit 71 is moved to the left, the sun gear 73 engages the internal teeth 96 on the carrier 52, and teeth 76,77 are withdrawn from the immobile ring 80. The rotating force of the shaft 46 is now transmitted through splines 48 to the planetary gear carrier 52. The sun gear unit 71 still engages the elongated planetary gears 93-95, but the unit 71 is free to rotate at its bearings 68-69 on the shaft 46. The transmission is now in a low speed gear.

To shift gears electrically, a pushing solenoid 110 is mounted to push against the shifting fork 84, thereby moving it on pivot points 111,112 to slide the sun assembly 71 to the right and high speed position. When the solenoid 110 is de-energized, a spring 114 moves the fork 84 to slide unit 71 back to the left and the low speed setting. This way, the transmission automatically sets itself to a low speed and high power selection, in the absence of a countermanning command signal acting on solenoid 110.

If the transmission system is used under an overrun condition, the clutch protects it. In greater detail, if an unprotected transmission is on a snowmobile, for example, going downhill, the motor could receive an unacceptable braking force which would ruin it. Likewise the shifting of an unprotected transmission, at very high speed, to the low speed range could cause damage. However, this damage does not happen with the invention since the reverse driving action of a runaway load acting through the transmission begins to turn clutch drum 36, perhaps even faster than the shoes 32,33 are being turned by the motor. This turning of drum 36 causes the clutch to slip and protect the motor.

The manner in which the clutch slips relative to the outer rotating drum when the drum is turning faster than the shoes 32 and 33 are being turned by the motor is shown in FIGS. 3 through 5 of the drawings.

FIG. 3 of the drawings shows the preferred embodiment of clutch assembly 12, having clutch shoes 32 and 33. Shoe 32 is located on shoe web 121 through shoe flange 123 and comprises two types of lining material 125 and 126. Lining 125 is a drive lining which, in the preferred embodiment, has a coefficient of friction of from 0.46 to 0.52. This is the portion of the shoe which does the driving in normal operations and has a radius of curvature approximately coinciding to dashed line 130 acting through the center of the driver. When drum 36 is being driven by clutch shoe 32, for example, in the direction designated by "A", drive tooth 120 within receiving notch 30 of the shoe web pushes against notch 30 so as to drive lining 125 into close communication with drum 36. Through the substantially high coefficient of friction on drive lining 125, clutch shoe 32 drives drum 36 for further transmission of torque to the remainder of the transmission. In the particular embodiment shown by FIG. 3, clutch assembly 12 utilizes an equivalent shoe and drive tooth arrangement to that previously discussed, on its other side, namely, clutch shoe 33 utilizing shoe web 122, shoe flange 124 and drive notch 31. It should be realized, however, that a conventional shoe and lining assembly can be used on the other side of the clutch with slightly less efficient results. Slip lining 126, the other material utilized on the remainder of shoe 32, has a coefficient of friction, in the preferred embodiment, of 0.20 to 0.24. Additionally, slip lining 126 has a radius of curvature equivalent to dashed line 131 which is slightly offset at its rotating point from the center 127 of the driver. Thus, it should be clearly seen that clutch shoe 32 has an overall circumferential dimension smaller in size than the inner periphery of drum 36. Thus, when drive lining 125 is engaged with drum 36, a gap is present between the drum and slip lining 126. Conversely, when the drum is in substantial contact with slip lining 126, a gap is present between drive lining 125 and drum 36, as shown in FIGS. 3 and 4. Gap 129 and 130 as shown in FIG. 3 corresponds to the gaps which arise when alternate sides of the clutch shoe make contact with the inner periphery of drum 36.

FIG. 4 of the drawings illustrates the slippage feature of the present invention which is capable of occurring when clutch drum 36 is rotating more rapidly in the direction designated by A than clutch shoe 32 is being turned in the same direction. Such a situation might occur during a runaway condition where the drum is rotated by the load even faster than the motor is rotating the shoes. Similarly, equivalent results are encountered when the transmission is shifted to low under high speed conditions. In such a situation, drum 36 will, in reality, be rotating in the direction indicated by B relative to the rotation of clutch shoe 32. Driving tooth 120, which is shaped to exert a force squarely onto the sides of drive notch 30, throws slip lining 126 into direct communication with the inner periphery of drum 36. As previously mentioned, lining 126 has a lower coefficient of friction than drive lining 125, which has been thrown out of contact with the inner periphery of drum 36 so as to form gap 130 between lining 125 and drum 36. Through such a design, dry clutch 12 is given a capability of driving a drum under load and slipping when the drum overruns the rotation of the clutch shoes themselves.

FIG. 5 of the drawing illustrates the top view of clutch shoe 32 having drive lining 125, slip lining 126, all of which are attached to the shoe web via shoe flange 123.

Those skilled in the art will readily perceive how various modifications may be made in the invention without departing from the spirit and scope thereof. For example, the drawing shows two brake shoes 32,33; however, any number of brake shoes may be used. Accordingly, the appended claims are to be construed to cover all equivalent structures.

What is claimed is:

1. An automatic transmission apparatus for cooperation with a power input means and power output means and interposed therebetween comprising;
    power input connection means for connecting said power input means into said transmission apparatus;
    dry clutch means operably connected to said power input connection means;
    said dry clutch means comprising at least one shoe and drum and having means responsive to centrifugal force for causing said at least one shoe to engage said drum only when said power input means is up to driving speed with respect to said power output means;
    means for obtaining slippage between said drum and shoes of said clutch means relative to each other when said power output means overruns said power input means;
    clutch output means connecting said drum of said dry clutch means to planetary drive means for alternatively selecting two or more drive ratios to said output means through electrical activation means,
    said planetary drive means comprising a planetary drive shaft gear, a drive shaft integrally formed with the planetary drive shaft gear, a planetary output gear operably connected to said power output means, planetary gear carrier means fixed to the drive shaft and sun gear shifting means,
    first and second intermeshing planet gears journalled on the planetary gear carrier means,
    a first sun gear axially slidably journalled on the shaft and continuously meshing with the second planet gears,
    means for sliding the first sun gear to selectively lock it to the planetary gear carrier means,
    a second driven sun gear journalled on the shaft and continuously meshing with the first planet gears, and
    said sun gear shifting means alternating the transmittal of torque between said drive ratio in cooperation with said planetary gear carrier means for transmittal of said torque to said planetary output gear means and in turn said power output means.

2. The invention according to claim 1 in which said means for obtaining slippage between said drum and shoes of said clutch means comprises one or more of said at least one clutch shoe having a plurality of clutch shoe linings,
    each of said plurality of clutch shoe linings having different coefficients of friction, ranging from a substantially high to substantially low value; and
    means within said clutch for alternatively exposing said substantially high coefficient of friction lining to said drum when said shoes drive said drum and exposing said substantially low coefficient of friction lining to said drum when said power output means overruns said power input means thereby enabling slippage to occur between said drum and said at least one clutch shoe.

3. The invention according to claim 2 in which said clutch means comprises two shoes interposed inside the drum;
    said shoes being held in a compact position by spring force, and flung outwardly to grip the drum where centrifugal force overcomes the spring force.

4. The invention according to claim 3 in which said power input means is connected to said shoes and said power output means is connected to said drum, whereby said drum and shoes tend to slip relative to each other when said output means overruns the power input means.

5. The invention according to claim 4 in which one or more of said at least one clutch shoe comprises a clutch shoe drive lining on a first side of said shoe;
    said drive lining having said substantially high coefficient of friction and communicating with said drum when said power input means is driving said power output means and gripping said drum thereby engaging said clutch; and
    a clutch shoe slip lining on a second side of said shoe,
    said slip lining having said substantially low coefficient of friction and communicating with said drum when said power output means is overrunning said shoes of said clutch thereby enabling slippage between said shoe and said drum.

6. The invention according to claim 5 in which said substantially high coefficient of friction is between the range of 0.46 to 0.52.

7. The invention according to claim 5 in which said substantially low coefficient of friction is between the range of 0.20 to 0.25.

8. The invention according to claim 5 in which said means for alternatively exposing said high or low coefficient lining portions comprises:
    said at least one clutch shoe lining surface having a smaller radius of curvature than the inner periphery of said drum;
    a drive notch within said shoe which communicates with a drive tooth on said power input means,
    said drive notch having a first side which when driven by said drive tooth directs the higher coefficient lining portion into contact with said drum;
    said drive notch having a second side which when driven by said drive tooth directs the lower coefficient lining portion into contact with said drum.

9. The invention according to claim 1 in which said clutch output means comprises a clutch output gear and idler gear assembly.

10. The invention according to claim 1 in which said planetary gear carrier means comprises a cluster of said planet gears enclosed within a carrier member, said carrier member terminating in a ring gear selectively engaged by said first sun gear when shifted to one position,
    said sun gear shifting means having locking means for immobilizing said sun gear shifting means when shifted out of engagement with said ring gear.

11. The invention according to claim 1 in which said electrical activation means selectively shifts said planetary drive means into one of said two or more drive ratios,
    said electrical activation means shifting said sun gear shifting means against spring pressure to a high speed of said two or more drive ratios,
    said spring pressure automatically resetting said sun gear shifting means to a low speed of said two or more drive ratios when said electrical activation means is not energized.

* * * * *